United States Patent [19]

Yamamitsu et al.

[11] 4,137,547
[45] Jan. 30, 1979

[54] DROP-OUT RESPONSIVE MAGNETIC RECORDING AND REPRODUCING SYSTEM

[75] Inventors: Chojuro Yamamitsu, Kawanishi; Ichiro Arimura, Kyoto; Sadafumi Kitamura, Neyagawa; Norio Meki, Takatsuki, all of Japan

[73] Assignee: Matsushita Electric Industrial Co., Ltd., Osaka, Japan

[21] Appl. No.: 842,883

[22] Filed: Oct. 17, 1977

[30] Foreign Application Priority Data

Oct. 19, 1976 [JP] Japan .................. 51-125765
Oct. 20, 1976 [JP] Japan .................. 51-126590

[51] Int. Cl.² ........................... H04N 5/76
[52] U.S. Cl. ............................... 358/8
[58] Field of Search ..................... 358/8; 360/38

[56] References Cited

U.S. PATENT DOCUMENTS 4,012,774  3/1977  Kuniyoshi et al. ................ 358/8

Primary Examiner—John C. Martin
Attorney, Agent, or Firm—Stevens, Davis, Miller & Mosher

[57] ABSTRACT

A magnetic recording and reproducing system which separates a brightness signal and a carrier color signal from a color television signal, frequency modulates the brightness signal and converts the carrier color signal to a lower frequency, records the modulated brightness signal and the low frequency carrier color signal in different manner for each horizontal scan line such that phases of the carrier are different between adjacent record tracks, and plays back the recorded signal through a comb filter to eliminate crosstalk from adjacent tracks in the carrier color signal. In this system, a horizontal synch. signal is eliminated in response to the detection of dropouts so as to prevent the disturbance of AFC and APC loops by dropouts, which would otherwise create color irregularity, and the horizontal synch. signal free of noise due to dropouts is used to activate the AFC and APC loops.

9 Claims, 8 Drawing Figures

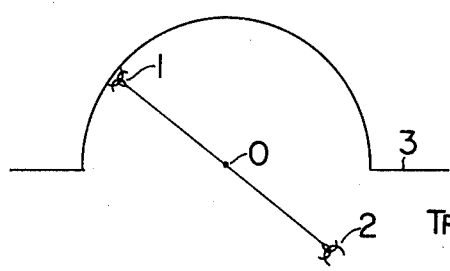
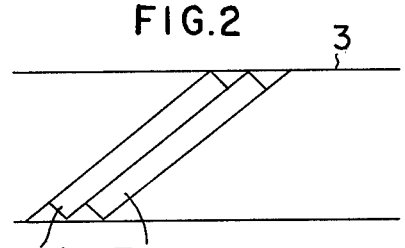
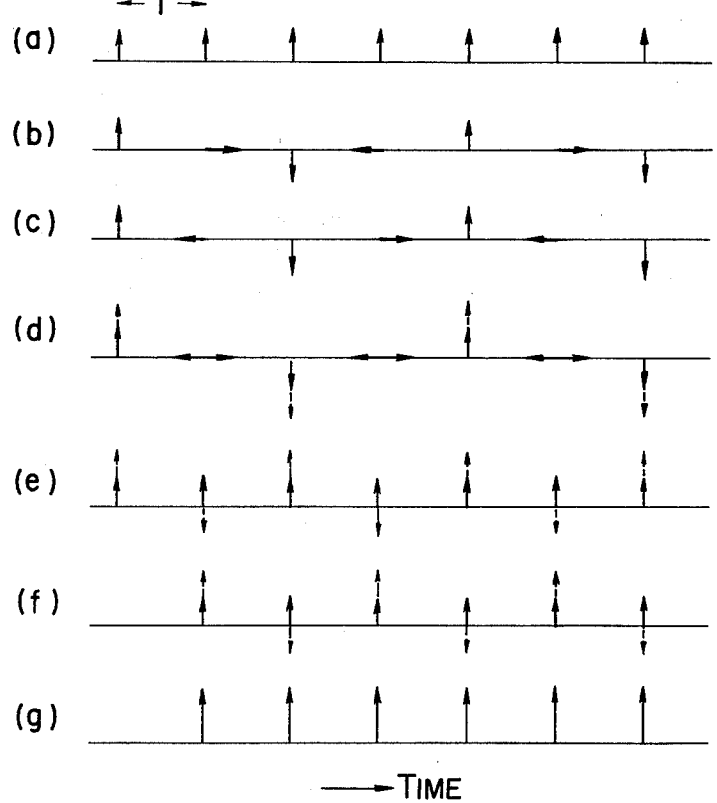

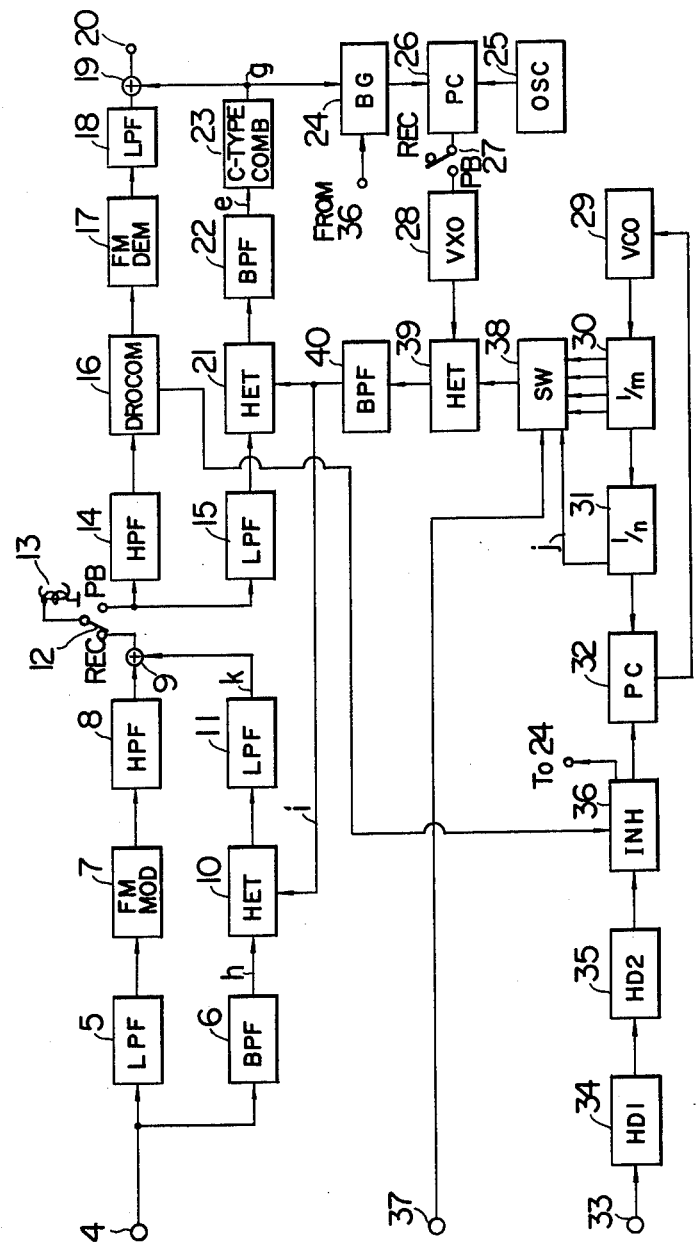
F I G. 4

FIG.5
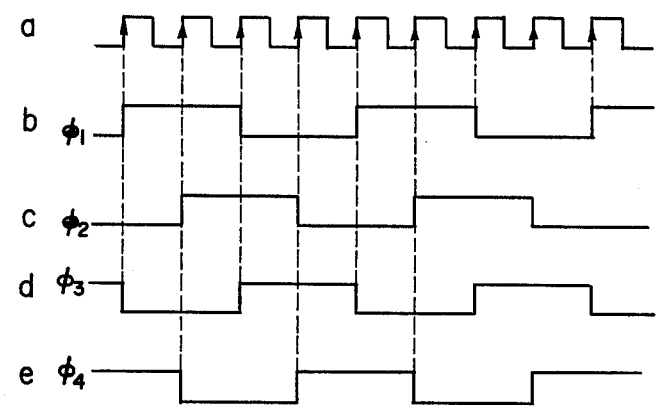
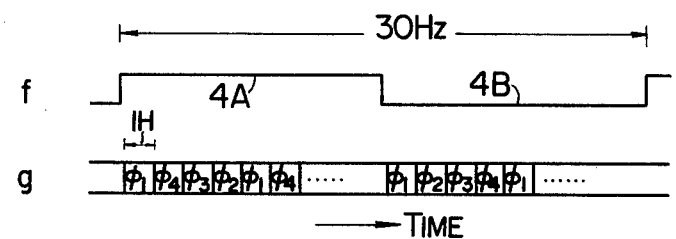
FIG.8
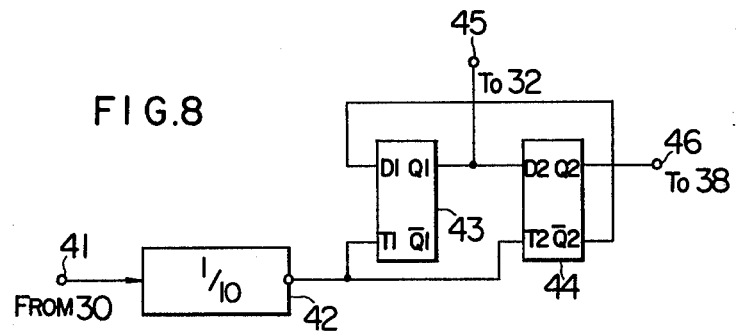

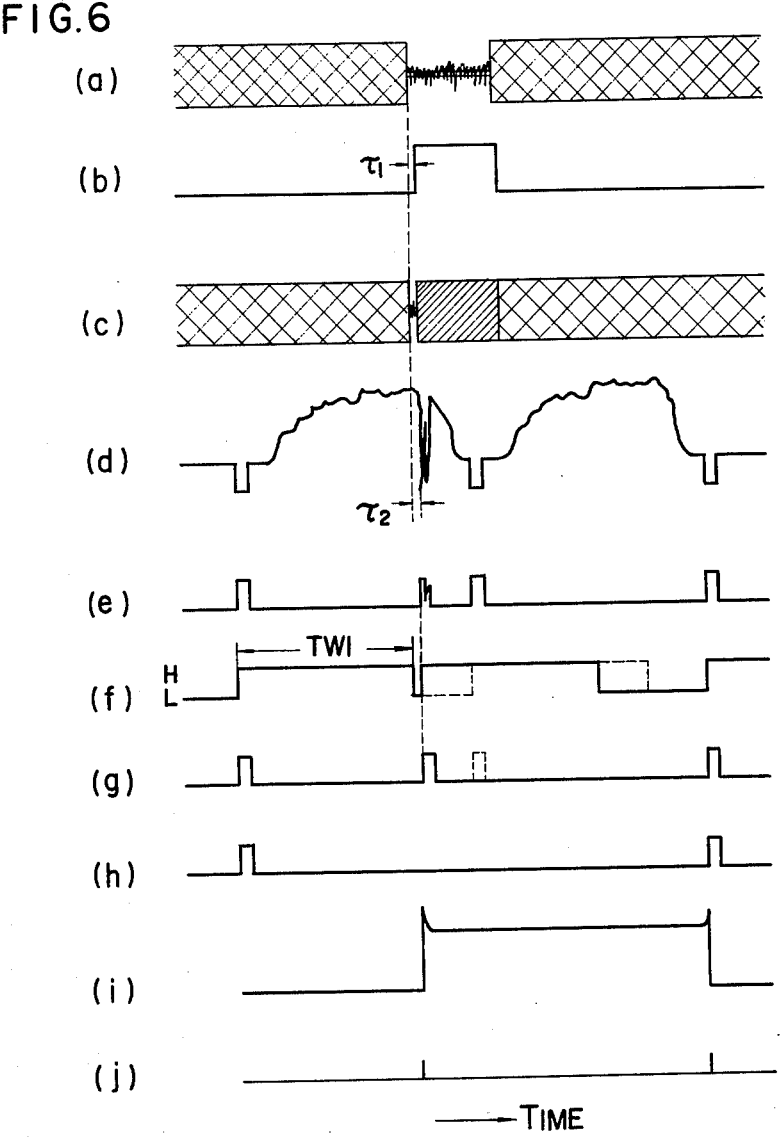

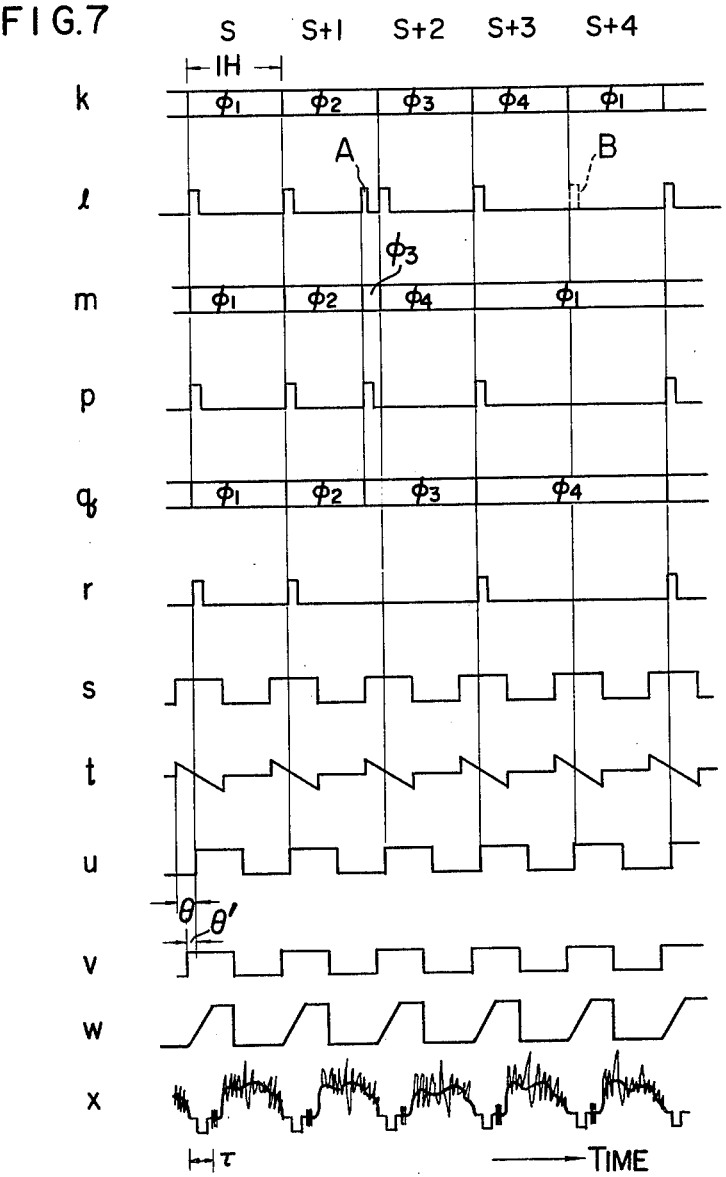

DROP-OUT RESPONSIVE MAGNETIC RECORDING AND REPRODUCING SYSTEM

The present invention relates to a recording and reproducing system for a color television signal, and it provides a novel means for effectively operating time axis correction for a color signal for producing a stable color image in a high density recording, that is, effectively operating an AFC (automatic frequency control) circuit and an APC (automatic phase control) circuit.

In a prior art simple recording and reproducing system for the color television signal (VTR), a brightness signal is angle modulated (e.g. frequency modulated) at a high frequency band, a carrier color signal is frequency converted to a lower frequency side thereof and both signals are combined and recorded on a record medium. On playing back the signals, the angle modulated signal is angle demodulated to reproduce the original brightness signal while the low frequency converted carrier color signal is frequency converted again to reproduce the original carrier color signal and both signals are combined to reproduce the color signal.

In the VTR, the reproduced signal is subjected to time axis variation by now, flatter or the like during tape transport. In order to prevent the carrier color signal from being affected by the time axis variation, an APC circuit in which the frequency conversion is carried out by a continuous signal which is in phase synchronism with the reproduced color burst signal and follows the time axis variation, to compensate for the time axis variation component, or an AFC circuit in which the low frequency converted carrier color signal to be reproduced is frequency converted by a continuous signal which is in phase synchronism with the reproduced horizontal synch. signal, to compensate for the time axis variation component, have been used.

In general, because the VTR includes a substantial amount of time axis variation, an LC or RC type variable frequency oscillator which has a good frequency response and an oscillation frequency of which can be controlled over a wide range is used as a variable frequency oscillator for generating the continuous signal which tracks the time axis variation.

The VTR includes dropouts due to dust or damage on the tape. A dropout compensation circuit is, therefore, usually included. In a simple dropout compensation circuit, the reproduced frequency modulated wave is amplified, and after having passed the amplified signal through an amplitude limiting circuit the signal is fed to a low pass filter for envelope detection so that the dropout period is detected for generating a compensation signal. However, due to the time delay of the low pass filter and the time delay of a pulse shaping circuit, the dropout detection pulse will be generated approximately 1 μsec after the actual dropout. Therefore, a non-compensated signal portion appears in the reproduced signal. Since the non-compensated signal portion is similar to the synch. signal, the AFC circuit may respond to the dropout, in addition to the time axis variation, to judge that the time axis variation has occurred and may change the phase. As a result, the phase of the carrier color signal changes for a moment, but depending upon the degree of the change, the APC circuit of the color television receiver may not respond thereto, and the color irregularity appears on the image over several horizontal scan cycles.

Further, in the APC system also when the synch. signal increases by the dropout, a burst sampling circuit in the APC system sample the color signal portion, and as a result the color irregularity appears over several horizontal scan cycles.

It is, therefore, an object of the present invention to provide a magnetic recording and reproducing system which can operate the AFC and APC circuits in a stable manner even when the dropout occurs for realizing a signal reproduction in which color irregularity does not occur.

It is another object of the present invention to provide a magnetic recording and reproducing system which can operate the AFC and APC circuits in a stable manner even when dropouts occur for enhancing color reproduction fidelity and for enabling high density recording and reproduction.

According to the magnetic recording and reproducing system of the present invention, stable phase switching of the carrier color signal is always assured so that the affect of adjacent tracks can be fully eliminated and the affect on the carrier color signal by the dropout can be eliminated, and a stable color picture free from color irregurality can be obtained.

These and other objects, features and advantages of the present invention will be apparent from the following description of the preferred embodiments of the invention when taken in conjunction with the accompanying drawings, in which:

FIG. 1 shows a schematic view of a two-head helical scan type VTR;

FIG. 2 shows an example of a record track when recorded at a high density by the VTR of FIG. 1;

FIG. 3 illustrates a principle of operation for eliminating crosstalk of the carrier color signal from adjacent tracks in a high density recording;

FIG. 4 shows a block diagram of one embodiment of a VTR in accordance with the present invention;

FIG. 5 illustrates the operation of a phase rotary circuit in FIG. 4;

FIG. 6 shows waveforms for illustrating the operation of an AFC loop in FIG. 4;

FIG. 7 shows waveforms for explaining the operation of an APC loop in FIG. 4; and FIG. 8 shows a block diagram of an 1/n frequency divider in FIG. 4.

Several VTR systems have been proposed which are capable of carrying out recording and reproducing of high density color television signals. As an example, a VHS system as shown in FIGS. 1, 2 and 3 is known.

In this type of VTR, signals are recorded on a magnetic tape 3 by magnetic heads 1 and 2 which are rotated around a rotation center 0 as shown in FIG. 1. The angles of the operation gaps of the magnetic heads 1 and 2 differ from each other by approximately ± 6°, which forms a so-called azimuth angle. Because of this azimuth angle, a large loss in high frequency components (azimuth loss) is included so that a high density recording can be attained without a guard band (non-recorded band). Thus, because the carrier wave is at several MHz, the angle modulated brightness signal is not subjected to the influence from the adjacent tracks without the guard band, by virtue of the azimuth loss. On the other hand, the low frequency converted carrier color signal is at several hundreds KHz and hence has a low azimuth loss. Therefore, it is subjected to the influence of the color signal from the adjacent tracks. In order to eliminate the influence of the adjacent tracks, the low frequency converted carrier color signal is arranged so that it is frequency interleaved between adjacent tracks and the influence of the adjacent tracks is eliminated through a comb filter.

FIG. 3 illustrates a mechanism of eliminating the crosstalk from the carrier color signal. In FIG. 3, (a) shows a color burst signal phase of an NTSC color television signal, in which T represents one horizontal scan period (one line), (b) shows a carrier color signal phase recorded on a track A by the video head 1 having an azimuth angle of $+\theta$, that is, it shows the signal (a) the phase of which has been rotated by 90° in a counterclockwise direction for each line, (c) shows a carrier color signal phase recorded on an adjacent track B by the video head 2 having an azimuth angle of $-\theta$, that is, it shows the signal (a) the phase of which has been rotated by 90° in a clockwise direction for each line, (d) shows a reproduced signal which has been influenced by the adjacent track B on which the signal (c) has been recorded, when the record track on which the signal (b) has been recorded is reproduced by the video head 1 having the azimuth angle of $-\theta$, in which a solid line represents the reproduced signal reproduced from the record track of the signal (b) by the video head 1 and a broken line represents a sprious component from the adjacent track B, (e) shows the signal (d) which has been sequentially rotated by 90° in the clockwise direction to change the solid line signal back to the original carrier color signal, in which it has been rotated by 0° on line s, by 90° on line s+1, by 180° on line s+2 and by 270° on line s+3, (f) shows the signal (e) which has been delayed for 1 horizontal scan period (one line), and (g) shows a signal made by adding the signals (e) and (f), showing that the sprious component (broken line) has been eliminated.

In such a recording and reproducing system, when a dropout occurs and an increase or decrease of the synch. signal occurs, in addition to the problems encountered in the prior art AFC and APC circuits as described above, the carrier color signal phase switching may operate improperly so that the switching phase remains improper from the point of erroneous operation to the end of that field. Therefore, a phenomenon similar to skew is observed, which causes a substantial amount of change in color phase. The experiment showed that the color irregularity might occur over 10–20 horizontal scan cycles.

FIG. 4 shows an embodiment of the present invention in which the low frequency converted carrier color signal is recorded in an interleaved manner between the adjacent tracks and the crosstalk is eliminated by the comb filter.

An NTSC color television signal 4 to be recorded is divided into a brightness signal and a carrier color signal by a low pass filter 5 and a band pass filter 6, and the separated brightness signal is preenphasized and then is frequency modulated by a frequency modulator 7, thence through a high pass filter 8 and is applied to an adder 9. On the other hand, the separated carrier color signal h is frequency converted by a carrier i in a frequency converter 10, and is then fed to a low pass filter 11 to produce a low frequency converted carrier color signal k, which is then applied to the adder 9, an output of which passes through a record/playback switch 12 to a video head 13 for recording on a magnetic recording medium.

In producing the signal i during recording, a first pulse having a pulse duration which is shorter than 1H period (one horizontal scan period) T (63.5 μsec) and longer than T/2 is generated from a composite synch. signal applied at a terminal 33, by a monostable multivibrator 34, to eliminate vertical synch. signal and equalization pulse. This prevents unstable operation of the AFC circuit which would otherwise occur by the vertical synch. signal or the equalization pulse. The output of the monostable multivibrator 34 is applied to a second monostable multivibrator 35 which produces a second pulse a leading edge of which coincides with that of the first pulse and which has a pulse duration of several μsec. The second pulse is applied to a phase comparator 32 through an inhibit circuit 36 to be described later. On the other hand, a first variable frequency oscillator 29 generates pulses at an oscillation frequency of $n \cdot m \cdot f_H$, as shown in FIG. 5a, where m and n are integers and $f_H \doteq 15.734$ KHz. The output of the variable frequency oscillator 29 is frequency divided by a factor of m (m being 4 in the illustrated embodiment) by a 1/m frequency divider 30, an output of which is further frequency divided by a factor of n (n being 40, for example) by a 1/n frequency divider 31, an output of which is then applied to the phase comparator 32, which, in turn, phase compares the output of the inhibit circuit 36 with the output of the 1/n frequency divider 31 to produce an error signal, which controls the first variable frequency oscillator 29. These circuits thus form the AFC circuit.

As shown in FIGS. 5b, 5c, 5d and 5e, the output of the 1/m frequency divider 30 has four phase outputs, i.e. 0°, 90°, 180° and 270° phases each having a frequency equal to $n \cdot f_H$, and they are applied to a 90° phase rotary circuit 38, which sequentially selects one of the four phase outputs by the switching pulse j at the horizontal frequency $f_H$ derived from the 1/n frequency divider 31, and applies it to a frequency converter 39. The 90° phase rotary circuit 38 changes the direction of the phase rotation at every field by a control signal which is applied to an input terminal 37 and which is reversed at every field as shown in FIG. 5f, so that the directions of the phase rotation for the adjacent tracks scanned by the azimuth heads having the azimuth angles of $+\theta$ and $-\theta$ are reversed from field to field. The control signal f is a train of pulses at the frequency of 30 Hz which is generated as the head cylinder rotates.

During recording, the record/playback switching circuit 27 is connected to REC (recording) side and the frequency converter 39 frequency converts the low frequency carrier of the frequency $f_c (= n \cdot f_H)$ from the rotary circuit 38 by the output of the variable frequency oscillator 28 which operates as a fixed frequency oscillator of the oscillation frequency $f_s$. Then, only the frequency components of $f_c + f_s$ are taken out by a band pass filter 40 and are applied to the frequency converter 10 which produces the low frequency converted carrier color signal.

The carrier color signal h, the carrier i from the band pass filter 40 and the low frequency converted carrier color signal k will now be discussed in detail. The carrier color signal h can be expressed by;

$$F_1 = \sin \omega_s t \qquad (1)$$

where $\omega_s (= 2\pi f_s)$ is an angular frequency of the carrier color signal. When the signal is recorded by the video head having the azimuth angle of $+\theta$, the carrier i is expressed by the following formulae which repeat every four horizontal periods (H);

$$F_2(s) = \sin(\omega_s + \omega_c)t \tag{2}$$

$$F_2(s+1) = \sin\{(\omega_s + \omega_c)t - 90°\} \tag{3}$$

$$F_2(s+2) = \sin\{(\omega_s + \omega_c)t - 180°\} \tag{4}$$

$$F_2(s+3) = \sin\{(\omega_s + \omega_c)t - 270°\} \tag{5}$$

where $\omega_c = 2\pi f_c$, and s represents an address of the horizontal scan line. Thus, the outputs of the frequency converters 10 which correspond to formulae (2), (3), (4) and (5) are given by;

$$F_1 \cdot F_2(s) = \tfrac{1}{2}\{\cos(\omega_s + \omega_c - \omega_s)t - \cos(\omega_s + \omega_c + \omega_s)t\} = \tfrac{1}{2}\{\cos\omega_c t - \cos(2\omega_s + \omega_c)t\} \tag{6}$$

$$F_1 \cdot F_2(s+1) = \tfrac{1}{2}[\cos(\omega_c t - 90°) - \cos\{(2\omega_s + \omega_c)t - 90°\}] \tag{7}$$

$$F_1 \cdot F_2(s+2) = \tfrac{1}{2}[\cos(\omega_c t - 180°) - \cos\{(2\omega_s + \omega_c)t - 180°\}] \tag{8}$$

$$F_1 \cdot F_2(s+3) = \tfrac{1}{2}[\cos(\omega_c t - 270°) - \cos\{(2\omega_s + \omega_c)t - 270°\}] \tag{9}$$

Only the first terms of the formulas (6), (7), (8) and (9) are extracted by the low pass filter 11 so that the low frequency converted carrier color signal k at the angular frequency of $\omega_c$, the phase of which is rotated to 0°, 90°, 180° and 270° in clockwise direction is produced, as shown in FIG. 3b.

Similarly, when the signal is recorded by a video head having the azimuth angle of $-\theta$, the low frequency converted carrier color signal k becomes a signal which has a phase which rotates in the counter-clockwise direction as shown in FIG. 3c, which is represented by the following formulae.

$$F_1 \cdot F_2(s) = \tfrac{1}{2}\cos\omega_c t \tag{10}$$

$$F_1 \cdot F_2(s+1) = \tfrac{1}{2}(\cos\omega_c t + 90°) \tag{11}$$

$$F_1 \cdot F_2(s+2) = \tfrac{1}{2}(\cos\omega_c t + 180°) \tag{12}$$

$$F_1 \cdot F_2(s+3) = \tfrac{1}{2}(\cos\omega_c t + 270°) \tag{13}$$

The low frequency converted carrier color signal k thus produced is combined with the frequency modulated brightness signal by the adder circuit 9, an output of which is passed through the record/playback switching circuit 12 and is recorded on a magnetic tape by a head 13.

In playback, the reproduced signal from the video head 13 passes through the record/playback switch 12 and is divided into the frequency modulated brightness signal and the low frequency converted carrier color signal by a high pass filter 14 and a low pass filter 15. The frequency modulated signal is passed through a dropout compensation circuit 16 and is detected by a frequency demodulator 17, an output of which is applied to a low pass filter 18 to reproduce the brightness signal, which is applied to an adder 19 which combines the brightness signal with the carrier color signal to be described later and the combined output is fed to a color television signal output terminal 20. On the other hand, the separated low frequency converted carrier color signal shown in FIG. 3d is applied to a frequency converter 21 where it is frequency converted by the carrier i, and the converted signal is fed to a band pass filter 22 to reproduce the carrier color signal.

During playback, the reproduced composite synch. signal is applied to the input terminal 33, and the low frequency carrier at the frequency $f_c = n \cdot f_H$, which is in phase synchronism with the horizontal synch. signal which has been affected by the time axis variation, through the AFC loop comprising the variable frequency oscillator 29, the 1/m frequency divider 30, the 1/n frequency divider 31 and the phase comparator 32, is produced by the 1/m frequency divider 30 and the rotary circuit 38. The output of the rotary circuit 38 is expressed by $(n \cdot f_H + n \cdot \Delta f_H)$, where $\Delta f_H$ is the time axis variation of the horizontal synch. signal. This output is frequency converted by the output of the variable frequency oscillator 28 and is used to frequency convert the reproduced low frequency carrier color signal by the frequency converter circuit 21 to reproduce the original carrier color signal. On the other hand, the carrier color signal e is passed through a comb filter and is applied to a burst gate circuit 24 where a burst signal is extracted for application to the phase comparator 26, to which the output of the fixed oscillator 25 is also applied. The phase comparator 26 phase compares both signals to produce an error signal which is applied to the record/playback switch 27 to control a second variable frequency oscillator 28, which uses a crystal resonator for the purpose of in-phase control to enhance the comb effect of eliminating the adjacent crosstalk and of enhancing temperature stability. The APC loop enables the phase control of the carrier color signal for the time axis variation which is free from dropouts and the carrier color signal phase switching.

The signal reproduction operation is now explained in detail by formulae. When a signal is reproduced by a head having an azimuth angle of $+\theta$, a principal signal as shown in FIG. 3b is produced. Thus, a principal signal M in the output of the low pass filter 15 is represented by the following formulae which correspond to the formulae (6), (7), (8) and (9);

$$M(s) = \cos\omega_c t \tag{14}$$

$$M(s+1) = \cos(\omega_c t - 90°) \tag{15}$$

$$M(s+2) = \cos(\omega_c t - 180°) \tag{16}$$

$$M(s+3) = \cos(\omega_c t - 270°) \tag{17}$$

The sprious component N which is the crosstalk from adjacent tracks is represented as follows from the formulae (10), (11), (12) and (13);

$$N(s) = \cos\omega_c t \tag{18}$$

$$N(s+1) = \cos(\omega_c t + 90°) \tag{19}$$

$$N(s+2) = \cos(\omega_c t + 180°) \tag{20}$$

$$N(s+3) = \cos(\omega_{ct} + 270°) \tag{21}$$

The frequency conversion by the frequency converter 21 can be expressed by a general formula;

$$\cos(\omega_c t + \theta_1)\cdot\sin\{(\omega_c + \omega_s)t + \theta_3\} = \tfrac{1}{2}[\sin\{(2\omega_c + \omega_s)t + \theta_1 + \theta_3\} - \sin\{(\omega_c - \omega_c - \omega_s)t + \theta_1 - \theta_3\}] \tag{22}$$

where $\cos(\omega_c t + \theta_1)$ represents the signal, and $\sin\{(\omega_c + \omega_s)t + \theta_3\}$ represents the carrier.

Since only the second term in the formula (22) is extracted by the band pass filter 22, the resultant carrier is expressed by:

$$-\tfrac{1}{2}\sin(-\omega_s t + \theta_1 - \theta_3) = \tfrac{1}{2}\sin(\omega_s t + \theta_3 - \theta_1) \quad (23)$$

where $\theta_1$ corresponds to the phase angle in the formulas (14)–(21), and $\theta_3$ corresponds to the phase angle of the carrier. Therefore, in order that the principal signal represented by the formula (23) be equal to $\tfrac{1}{2}\sin \omega_s t$, the relation of $\theta_3 - \theta_1 = 0$ must be met.

Thus, since the low frequency converted carrier color signal to be reproduced has the phase angle which is sequentially changed by 90° for each horizontal scan as shown by the formulas (14), (15), (16) and (17), in correspondence with this the phase of the low frequency carrier is switched during playback also by the rotary circuit 38 such that the phase rotation occurs in an opposite sense. In this case, for the sprious component N, $\theta_3 - \theta_1$ becomes to be 0°, −180°, 0° and −180°. The output e at the band pass filter 22 is shown in FIG. 3e. The output e is applied to the comb filter 23 where the sprious component is eliminated to produce the carrier color signal including only the primary signal component, as shown in FIG. 3g.

Detail of a major portion of the present invention will now be explained. FIG. 6(a) shows the output of the high pass filter 14 in which a dropout has occurred, and FIG. 6(b) shows a dropout detection pulse produced by the dropout compensation circuit 16. Since the dropout is detected by passing the output of the bypass filter 14 to the low pass filter to detect the envelope, the detection pulse occurs at a time $\tau_1$ later than the moment of the dropout. FIG. 6(c) shows the output of the dropout compensation circuit 16 in which the signal during the dropout period has been substituted by the signal in the previous horizontal scan period. The hatched portion in FIG. 6(c) shows the signal in the previous period which has been inserted in the dropout portion. FIG. 6(d) shows the output of the low pass filter 18, which occurs $\tau_2$ times later than the occurrence of the dropout as shown in FIG. 6(a). As is clear from the figure it is so made that $\tau_2 > \tau_1$. In FIG. 6(d), the dropout portion appears as noise, which may appear in the synch. signal or may appear near a white signal as the case may be. FIG. 6(e) shows the composite synch. signal separated from the output of the low pass filter 18 and shows only that horizontal synch. signal period which includes noise due to the dropout in the synch. signal. The separated composite synch. signal is applied to the input terminal 33.

If the signal of FIG. 6(e) is applied to the phase comparator 32, it will produce a phase error voltage due to the noise (dropout) resulting in a substantial change in the carrier color signal phase. If the signal of FIG. 6(e) is used as the gate pulse to operate the burst gate circuit 24, it will extract the carrier color signal or blanking noise resulting in change in the carrier color signal. Further, if the signal of FIG. 6(e) is used as the carrier color signal phase switching signal, the rotary circuit will operate improperly to produce discontinuity in the 90° or 180° carrier color signal phase, which requires more than several horizontal scan periods before stabilization. For the reasons described above, the signal of FIG. 6(e) cannot be used for those purposes.

FIG. 6(f) shows the output of the monostable multivibrator 34 in FIG. 4. The output of the multivibrator 34 is not influenced by a dropout appearing at the high level portion, but if a dropout occurs at the low level portion, the output of the monostable multivibrator 34 is instantly changed to the high level. The solid line in FIG. 6(f) shows the waveform which has been influenced by the dropout and the broken line shows a normal waveform. In FIG. 6(f), if the pulse width $TW_1$ is set to be equal to one horizontal scan period, the affect by the dropout would be eliminated. Actually, however, it cannot be set beyond 70–85% of one horizontal scan period because of the change in tape speed, time axis change and temperature characteristic of the monostable multivibrator etc.

FIG. 6(g) shows the output of the second monostable multivibrator 35, in which the output shown in FIG. 6(f) has been shaped to several $\mu$sec pulse starting from the leading edge of the output of FIG. 6(f). If the output in FIG. 6(g) is directly applied to the phase comparator 32, the phase comparator output rises as shown in FIG. 6(i) resulting in the disturbance of the AFC loop. The output shown in FIG. 6(i) shows an ideal case and, in actual fact, it will take several horizontal scan periods before the output converges to a normal value. Thus, the dropout will cause instant and substantial disturbance of the carrier color signal phase. In accordance with the present invention, inhibit circuit 36 is provided between the monostable multivibrator 35 and the phase comparator 32 to inhibit the input pulse to the AFC in response to the dropout detection pulse, as shown in FIG. 6(b), derived from the dropout compensation circuit 16. By inhibiting the pulse in FIG. 6(g) by the pulse in FIG. 6(b), the waveform shown in FIG. 6(h) is produced. The inhibit circuit 36 is constructed with, e.g., an AND circuit having one input terminal to which the inverted signal b of the dropout detection signal shown in FIG. 6(b) is applied and another input terminal to which the pulse train from the monostable multivibrator 35 is applied.

In this manner, by inhibiting the pulse train from the monostable multivibrator 35 for the dropout period, the pulse at the position of the horizontal synch. signal is eliminated if the dropout occurs in the horizontal synch. signal portion. By properly selecting the time constant of the hold circuit in the AFC circuit, the phase comparator output becomes constant as shown in FIG. 6(j) and the carrier color signal phase is not changed. In this manner, the discontinuity of the carrier color signal phase due to the effect of the dropout can be compensated.

The gate pulse to the burst gate circuit 24 which supplies the burst signal to the APC circuit is usually produced by delaying the input signal to the terminal 33 as shown in FIG. 6(e) or the output of the monostable multivibrator 35 as shown in FIG. 6(g). However, since the dropout noise becomes a reason for extracting the carrier color signal and the noise in the blanking period to cause the change of the carrier color signal phase as described above, the supply of the burst signal to the APC circuit is inhibited in the present invention when the dropout occurs. To this end, the output of the inhibit circuit 36 as shown in FIG. 6(h) is delayed to produce a gate pulse. The gate pulse may be derived from the signals shown in FIG. 6(e) and FIG. 6(g) to inhibit the supply thereof to the APC circuit when the dropout occurs. In this manner, the generation of the gate pulse by the dropout is prevented. The lack of the normal burst signal which occurs when the burst gate operation is inhibited by the dropout detection pulse does not affect the color reproduction whatever if the time constant of the APC circuit is properly selected as in the case of the AFC circuit described above. By so doing, like the AFC circuit, the AFC circuit will not be affected by the dropout and a stable image free from the color irregularity can be obtained.

In the VTR shown in FIG. 4, guardbandless recording is carried out to attain the high density recording, and the rotary circuit 38 is used to eliminate the crosstalk of the carrier color signal from the adjacent channels, and the low frequency color signal is recorded in rotating the phase of the low frequency color signal by 90° at every horizontal scan such that the phase rotation is reversed between the adjacent tracks, and the phase of the carrier used for frequency conversion is rotated also in a similar way at the time of playback. In this type of VTR, if the phase switching is once operated erroneously, a 90° phase difference occurs and remains from the point of erroneous operation until the end of that field, resulting in unstable operation of the APC circuit such as skew and color irregularity appears until the 90° phase error is corrected. Accordingly, a correct phase switching is required.

FIG. 7(k) shows the normal output phase of the rotary circuit 38, in which the phase $\phi_1$, $\phi_2$, $\phi_3$ and $\phi_4$ are shown in FIGS. 5(b), (c), (d) and (e). If the input to the monostable multivibrator 34 in FIG. 4 is used as the clock signal j for switching the output phase of the rotary circuit 38 for each horizontal scan, the output of the rotary circuit 38 will differ from the normal phase by 90° at the (s+2) and (s+3) horizontal scan lines, as shown in FIG. 7(m), by the pulse A due to the dropout as shown in FIG. 7(l) and the lack of the horizontal synch. signal. Similarly, if the output of the monostable multivibrator 35 is used as the clock j also, the phase $\phi_3$ will be shifted from the normal phase to the position of the pulse A by the dropout as shown in FIG. 7(p) and the phase at the (s+4) horizontal scan line at which the horizontal synch. pluse is missed will differ from the normal phase by 90° so that a stable image can not be obtained. In the present invention, therefore, the output of the 1/n frequency divider 31 as shown in FIG. 7(u) which is in phase synchronism with the output of the inhibit circuit 36 as shown in FIG. 7(r) is used as the trigger signal j for phase switching the rotary circuit 38.

When the square wave at the frequency $f_H$ as shown in FIG. 7(s) is used as the reference input to the phase comparator 32 to produce therefrom the sawtooth compare signal as shown in FIG. 7(t), the phase relation as shown is obtained so that the operation of the AFC circuit is stabilized. In this case, the signal, as shown in FIG. 7(u), the phase of which is retarded by $\theta$ which is approximately equal to 90° from the reference input shown in FIG. 7(s) is obtained and this signal is used to phase switch the rotary circuit 38. On the other hand, when the pedestal waveform as shown in FIG. 7(w) is used as the compare signal for the phase compare circuit 32, the reference input when the AFC circuit is in synchronism becomes as shown in FIG. 7(v), and one may make the trigger pulse j in this case a signal which is retarded by $\theta'$ from the reference input to the compare circuit 32 shown in FIG. 7(v). The leading edge of the $\theta'$ should be set at the horizontal blanking period in the composite signal shown in FIG. 7(x), before the beginning of the burst signal.

FIG. 8 shows an example of the 1/n frequency divider 31, n being 40. In FIG. 8, the output of the 1/m frequency divider, m being 4, is applied through a terminal 41 to a 1/10 frequency divider 42 which produces a pulse signal at the frequency of $4 \cdot f_H$. This pulse signal is applied to trigger input terminals of D-type flip-flops 43 and 44, respectively. Since the D-type flip-flop operates to produce a high level output by a trigger pulse which is applied when the D-terminal thereof is at high level, the output $Q_1$ of the flip-flop 43 is high and the output $Q_2$ of the flip-flop 43 is low at the first pulse, the $Q_1$ is high and the $Q_2$ is high at the second pulse, the $Q_1$ is low and the $Q_2$ is high at the third pulse, the $Q_1$ is low and the $Q_2$ is low at the fourth pulse, and the above sequence is repeated thereafter. Thus, the flip-flops 43 and 44 constitute a ¼ frequency divider and the pulse train is produced at the output terminal 46, which pulse train is retarded in phase by 90° from that at the output terminal 45. The pulse train obtained from the output terminal 45 as shown in FIG. 7(s) may be used as the reference input to the phase comparator 32 and the pulse train from the output terminal 46 as shown in FIG. 7(u) may be used as the phase switching signal j for the rotary circuit 38.

Two means have been shown in FIG. 7 as means for generating the reference signal to the phase comparator 32. While the both means operate properly, there exists a case, although very rare, where the demodulated signal includes noise in spite of no occurrence of the dropout, depending on the detection sensitivity of the dropout compensation circuit 16. In such a case, when the dropout occurs within 70–85% period of the one horizontal scan period as measured from the position of the horizontal synch. signal, it can be eliminated by the monostable multivibrator 34 and the AFC circuit will not be affected at all. If the inhibit circuit 36 operates erroneously in a region from the 70–85% position as measured from the horizontal synch. signal position to the next horizontal synch. signal position (near rear ¼ position of the horizontal scan period), a large error voltage will be produced if the output as shown in FIG. 7(t) is used as the compare signal to the phase compare circuit 32, so that the position of the phase switching signal is changed to permit switching at the position of the carrier color signal. On the other hand, if the compare signal is made the signal as shown in FIG. 7(w), the error voltage is equivalent to the one limited below a predetermined level so that the movement of the position of the switching signal is limited within a given range to prevent the phase switching from occurring at the position of the carrier signal. Therefore, the latter case is preferable when the worst case is taken into consideration.

In the present system, the position of the head switching signal applied to the input terminal 37 in FIG. 4 moves depending on the steady phase variation in the servo system, the temperature change or replacement of deck. If the amount of the moment exceeds one horizontal synch. signal range relative to the recorded position, the phase of the carrier color signal changes at every field or every frame, and much time is required for the APC circuit to track. As a result, the color irregularity appears at the top of the image. Prevention of such color irregularity may be made by phase detecting the reproduced burst signal by a continuous wave which has been derived by phase shifting the output of the fixed frequency oscillator 25 by 90° (like a color killer in the television receiver) to detect 180° discontinuous phase and changing the signal phase of the rotary circuit 38 by 180°, by the detected pulse.

As described hereinabove, the present invention is directed to a novel technique for providing a stable color image which is free from the color irregularity by means of inhibiting the sprious component of the sampling pulse of the AFC circuit, inhibiting the burst signal of the APC circuit or inhibiting both AFC and APC circuits, by the signal associated with the dropout (that is, the width of the detection pulse may be changed or the pulse which lasts until the trailing edge of the synch. signal when the dropout begins or terminates on the synch. signal), and also directed to a novel technique for removing erroneous operation of phase change and providing a stable color image which is free from color irregularity by switching the carrier color signal by the signal associated with the reference signal (that is, the signal derived by properly phase shifting the reference signal, or $\sin(\omega_H t + \theta)$, where $\theta = 0 \sim 360°$) to the AFC circuit in order to eliminate the adjacent crosstalk in the carrier color signal in the guard-bandless recording.

While the present invention has been described in conjunction with the system in which the carrier color signal phase is switched at every line, the present invention makes it possible to carry out a stable phase switching of the carrier color signal in a system in which the carrier color signal phase is switched at every integer number of lines, in a system as shown in FIG. 2 in which the phase is fixed in the track A and switched in the track B only (0°, 180° or rotary), or in a PAL system signal processing in which the adjacent crosstalk is eliminated in the same principle. Thus, the present invention can fully eliminate the affect of the adjacent tracks, eliminate the influence of the dropout to the carrier color signal and provide a stable image free from color irregularity. What is claimed is:

1. A magnetic recording and reproducing system wherein a brightness signal is angular modulated and a carrier color signal is frequency converted to a low frequency side of the modulated brightness signal, said modulated brightness signal and the frequency converted carrier color signal are recorded on a record medium, and in playback, said angular modulated brightness signal is demodulated while said low frequency converted carrier color signal is frequency converted to a high frequency and time axis correction is carried out; said magnetic recording and reproducing system comprising;

an input circuit means to which a synch. signal including at least horizontal synch. signal is applied;

a low frequency carrier generating means connected to said input circuit means for generating a low frequency carrier which is in phase synchronism with said horizontal synch. signal and which has a frequency equal to n times as high as the horizontal frequency;

a gate circuit means for extracting a burst signal from the reproduced carrier color signal by a gate signal which is in phase synchronism with said horizontal synch. signal;

a variable frequency oscillation means for producing an oscillation output which is in phase synchronism with the extracted burst signal;

a carrier generating means for frequency converting said low frequency carrier by the output of said variable frequency oscillation means to produce a carrier to be used in the frequency conversion to said high frequency;

a means for detecting dropout in the reproduced signal; and an inhibit circuit means connected between at least said input circuit means and said carrier generating means and responsive to the output of said dropout detection means to substantially inhibit the supply of the signal at the horizontal frequency to said low frequency carrier generating means and said burst signal to said variable frequency oscillation means.

2. A magnetic recording and reproducing system according to claim 1 wherein said low frequency carrier generating means includes;
   a variable frequency oscillation circuit having an oscillation frequency controlled by a control voltage;
   a frequency divider for dividing the output of said oscillation circuit; and
   a phase comparator for comparing the phase of the output of said frequency divider and the phase of the signal at the horizontal frequency derived from said inhibit circuit means to produce said control voltage.

3. A magnetic recording and reproducing system according to claim 1 wherein said variable frequency oscillation means includes;
   a reference frequency oscillation circuit;
   a phase comparator for comparing the phases of the output of said oscillation circuit and the burst signal derived from said gate circuit means; and
   a variable frequency oscillation circuit having an oscillation frequency controlled by the output of said phase comparator.

4. A magnetic recording and reproducing system according to claim 1 wherein said low frequency carrier generating means includes a phase switching means for changing the phase of the low frequency carrier in at least one of adjacent tracks by a clock signal for the horizontal period for every l horizontal scan lines, l being a positive integer.

5. A magnetic recording and reproducing system according to claim 1 wherein said low frequency carrier generating means includes;
   a variable frequency oscillation circuit means having a center frequency equal to n·m times as high as the horizontal synch. signal frequency $f_H$ and having an oscillation frequency controlled by a control voltage;
   a first frequency divider means for frequency dividing the output of said oscillation circuit means by the factor of m to produce a low frequency carrier having a frequency equal to n·$f_H$;
   a second frequency divider means for frequency dividing the ouput of said first freqeuncy divider means by the factor of n; and
   a phase comparator means for detecting a phase difference between the output of said second frequency divider means and the signal of the horizontal period derived from said inhibit circuit means to produce said control voltage for said variable frequency oscillation circuit means.

6. A magnetic recording and reproducing system according to claim 5 wherein said first frequency divider means produces a plurality of low frequency carriers having a predetermined phase difference, and said low freqeuncy carrier generating means includes a phase switching circuit for sequentially selecting one of said plurality of low frequency carriers derived from said first frequency divider means by a switching pulse at the horizontal frequency derived from said second frequency divider means.

7. A magnetic recording and reproducing system according to claim 6 wherein said second frequency divider means produces the signal at the horizontal frequency to be supplied to said phase comparator means and said switching pulse which is in a predetermined phase relation to said signal at the horizontal frequency.

8. A magnetic recording and reproducing system wherein a brightness signal is angular modulated and a carrier color signal is frequency converted to a low frequency side of the modulated brightness signal, said modulated brightness signal and the frequency converted carrier color signal are recorded on a record medium, and in playback, said angular modulated brightness signal is demodulated while said low frequency converted carrier color signal is frequency converted to a high frequency and time axis correction is carried out; said magnetic recording and reproducing means comprising;

a first variable frequency oscillation means for generating a low frequency carrier having an oscillation frequency controlled by a control voltage and having a phase which is in phase synchronism with a horizontal synch. signal;

a first phase comparator means for comparing the phase of the output of said first variable frequency oscillation means and the phase of the reproduced horizontal synch. signal to produce said control voltage for said first variable frequency oscillation means;

a gate means for extracting a burst signal from the reproduced carrier color signal by a gate signal;

a second phase comparator means for comparing the phases of said burst signal and a reference frequency signal;

a second variable frequency oscillation means having an oscillation frequency controlled by the output of said second phase comparator means;

a means for producing a carrier to be used in the frequency conversion of said reproduced low frequency carrier color signal by frequency converting said low frequency carrier by means of the output of said second variable frequency oscillation means;

a means for detecting dropout in the reproduced signal; and an inhibit circuit means responsive to the output of said dropout detection means for inhibiting the supply of the horizontal synch. signal to said first phase comparator means or the supply of the signal at the horizontal period derived from the horizontal synch. signal, and for substantially inhibiting the supply of the burst signal to said second phase comparator means.

9. A magnetic recording and reproducing system according to claim 8 wherein said first phase comparator means includes;

a means for receiving a composite synch. signal separated from the reproduced signal and adapted to be driven by a leading edge of said composite synch. signal to produce a first pulse having a fixed pulse width; and a means adapted to be driven by a leading edge of said first pulse to produce a signal at the horizontal period having a fixed pulse width to be supplied to said inhibit circuit means.

* * * * *